US012618460B2

(12) United States Patent
Watzek et al.

(10) Patent No.: US 12,618,460 B2
(45) Date of Patent: May 5, 2026

(54) AXLE SUPPORT ASSEMBLY FOR AN ELECTRICAL DEVICE

(71) Applicant: JOHNSON ELECTRIC INTERNATIONAL AG, Murten (CH)

(72) Inventors: Michael Watzek, Courgevaux (CH); Simon Weisflog, Ependes (CH)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 391 days.

(21) Appl. No.: 18/357,878

(22) Filed: Jul. 24, 2023

(65) Prior Publication Data

US 2024/0019021 A1    Jan. 18, 2024

Related U.S. Application Data

(63) Continuation of application No. PCT/EP2022/050682, filed on Jan. 13, 2022.

(30) Foreign Application Priority Data

Jan. 25, 2021    (GB) ...................................... 2100939

(51) Int. Cl.
*F16H 57/021*        (2012.01)
*F16C 33/10*          (2006.01)
*F16H 57/04*          (2010.01)

(52) U.S. Cl.
CPC ......... *F16H 57/021* (2013.01); *F16C 33/102* (2013.01); *F16H 57/0464* (2013.01)

(58) Field of Classification Search
CPC .. F16H 57/021; F16H 57/0464; F16C 33/102; F16C 17/02; F16C 17/10; F16C 2361/31; F16C 2380/26; F16C 2380/27; F16C 2380/28

USPC ............................................................ 310/91
See application file for complete search history.

(56) References Cited

U.S. PATENT DOCUMENTS

| | | | |
|---|---|---|---|
| 7,487,697 B2 | 2/2009 | Marla et al. | |
| 2004/0235605 A1* | 11/2004 | Cook ...................... | F16H 1/203 475/220 |
| 2005/0115349 A1* | 6/2005 | Okumura ............... | H02K 7/081 74/425 |
| 2006/0236963 A1* | 10/2006 | Fujii ................... | F01L 13/0026 123/90.27 |

FOREIGN PATENT DOCUMENTS

| | | |
|---|---|---|
| DE | 4101063 A1 | 7/1992 |
| FR | 2969547 A1 | 6/2012 |

OTHER PUBLICATIONS

International Search Report from Corresponding PCT Application No. PCT/EP2022/050682 Mar. 29, 2022.

* cited by examiner

*Primary Examiner* — Christopher M Koehler
*Assistant Examiner* — Viswanathan Subramanian
(74) *Attorney, Agent, or Firm* — Aird & McBurney LP

(57) ABSTRACT

An axle support assembly is provided for an electrical device, and which comprises an axle support defining an axle receiver having a cylindrical or substantially cylindrical side wall and an internal base portion. There is also an axle having an end which is dimensioned to be press-fit into the axle receiver. At least one venting channel extends between the internal base portion of the axle receiver and an exterior of the axle support when the axle is press fit into the axle receiver.

13 Claims, 6 Drawing Sheets

AXLE SUPPORT ASSEMBLY FOR AN ELECTRICAL DEVICE

CROSS-REFERENCE TO RELATED APPLICATIONS

This non-provisional patent application is a continuation application of PCT Application No. PCT/EP2022/050682, filed on Jan. 13, 2022, which claims priority to GB Patent Application No. 2100939.4, filed on Jan. 25, 2021, all of which are incorporated herein by reference in their entirety.

FIELD OF THE INVENTION

The present invention relates to an axle support assembly for an electrical device, particularly but not necessarily for an actuator. The invention further relates to an electrical device having such an axle support assembly.

BACKGROUND

When assembling actuators, it is common for the gear-support axles which support the gears of the gear train following the motor to be connected directly with the actuator housing, or with one or more intermediate plates or structures within the housing. One option is to integrally form the gear axles with the actuator housing, but this can prove complex to manufacture.

In most instances, separate axles will be installed into dedicated supports in the actuator housing, which are installed separately when the gear train is ready to be assembled. The axles can either be loose fit, in which case there is large noise generated by vibrations between the axle and the actuator housing in use, as well as creating a less stable axle. This is therefore the less preferred option.

Alternatively, the axles can be press fit, tightly fitting into the corresponding support axle. Where there is a tight press fit, the axles will be lubricated, typically with grease, prior to installation. This can lead to low noise and high axle stability.

The problem with this approach is that a high degree of manufacturing precision is required. When the axle is press fit into the actuator housing the grease becomes locked into the bottom of the axle support, along with air pockets which become compressed as the axle is urged into place during assembly. This can lead to cracking of the actuator housing. This issue can be overcome by drilling a hole from the inside of axle support to the outside of the actuator, but this leads to additional issues with grease contamination from the actuator.

SUMMARY OF THE INVENTION

It is therefore an object of the present invention to provide an improve means of fixing an axle in place in an electrical device which avoids the above-referenced issues.

According to a first aspect of the invention, there is provided an axle support assembly for an electrical device, the axle support assembly comprising: an axle support defining an axle receiver having a cylindrical or substantially cylindrical side wall and an internal base portion; an axle having an end which is dimensioned to be press-fit into the axle receiver; and at least one venting channel which extends between the internal base portion of the axle receiver and an exterior of the axle support when the axle is press fit into the axle receiver.

By providing an outlet from the axle support for compressed air and excess grease to escape, the build-up of force inside the axle support as the axle is installed is eliminated. This reduces the risk of cracking of the axle support. Similarly, by providing a press-fit arrangement, the problems associated with more loose-fit axle fixing mechanisms, such as increased vibrational damage and noise are avoided.

The axle may preferably be formed from metal. Optionally, the axle support may be formed from a plastics material or metal. In one arrangement, the axle may be formed from a harder and/or stiffer material than the axle support.

The axles have the advantage of, particularly in actuator arrangements, providing a stiffening effect to counteract compressive forces on the device housing. In particular, this is the case for metal axles used in plastic housings; however, this is also the case for which cracking of the housing is most commonly experienced in the art. The present invention overcomes this issue.

Optionally the venting channel may be formed contiguously with the cylindrical or substantially cylindrical side wall of the axle support.

The simplest option from a manufacturing perspective is to cut a channel into the side of the axle support, since the device housing will typically be formed from an easier material to work with than the axle. This is especially true if the housing is formed by an injection or compression moulding process, since extraction of the housing from tooling is a factor which must be considered.

In one alternative embodiment, the venting channel may form a bounded conduit from the internal base portion of the axle support through to the exterior of the axle support. The venting channel is configured to relieve air or fluid pressure generated during press-fit insertion of the axle into the axle receiver while maintaining the water-tight housing after assembly.

In this embodiment, the bounded conduit provides a means of evacuating air or grease to a user-desired location, which may allow, for example, extraction of the grease to a dedicated reservoir when it can be contained without risk of onward contamination.

In another alternative embodiment, the venting channel may be formed in the axle.

Forming the venting channel into the axle may simplify the manufacture of the device housing, since the additional factor of the venting channel does not need to be considered during moulding.

Preferably, the venting channel may have a rectilinear cross-section. In one alternative embodiment, the venting channel may have an at least in part circular cross-section.

Various options for the shape of the venting channel may be considered, based on the manufacturing constraints and which part of the assembly the channel is provided in.

The axle may be a gear-support axle.

The typical usage of such axles is for gear fixation within an actuator, and therefore suitable gear-support axles should be considered.

Optionally, the internal base portion of the axle support may be a closed base portion having no through holes therein.

To inhibit grease contamination from the electrical device, it is greatly preferred that grease cannot escape through the internal base of the axle support, since this would lead to grease accumulation in the environment.

According to a second aspect of the invention, there is provided an electrical device comprising an axle support assembly in accordance with the first aspect of the invention.

The advantage of the current arrangement is that the electrical device gains all of the benefits of the press fit fixation of the axle, such as reduced noise output and vibrational risk, whilst also mitigating the risk of cracking of the device housing.

Optionally, the axle support may be formed as part of a device housing of the electrical device.

Where the axle support is integrally formed, the axle inserted therein can act to stiffen the device housing as a whole.

In a preferable embodiment, the venting channel may extend between the internal base portion of the axle receiver and an interior of the device housing.

Keeping the venting channel dispensing to the interior of the housing further inhibits environmental contamination by the electrical device.

The device housing may be a water-tight housing.

Water-tight housings help to prevent grease contamination to the exterior of the electrical device.

Optionally, the axle support may be formed as part of an intermediate support structure within a device housing of the electrical device.

Preferably, the electrical device may be provided as an actuator.

BRIEF DESCRIPTION OF THE DRAWINGS

The invention will now be more particularly described, by way of example only, with reference to the accompanying drawings, in which.

DETAILED DESCRIPTION OF THE FIGURES

Figure 1:
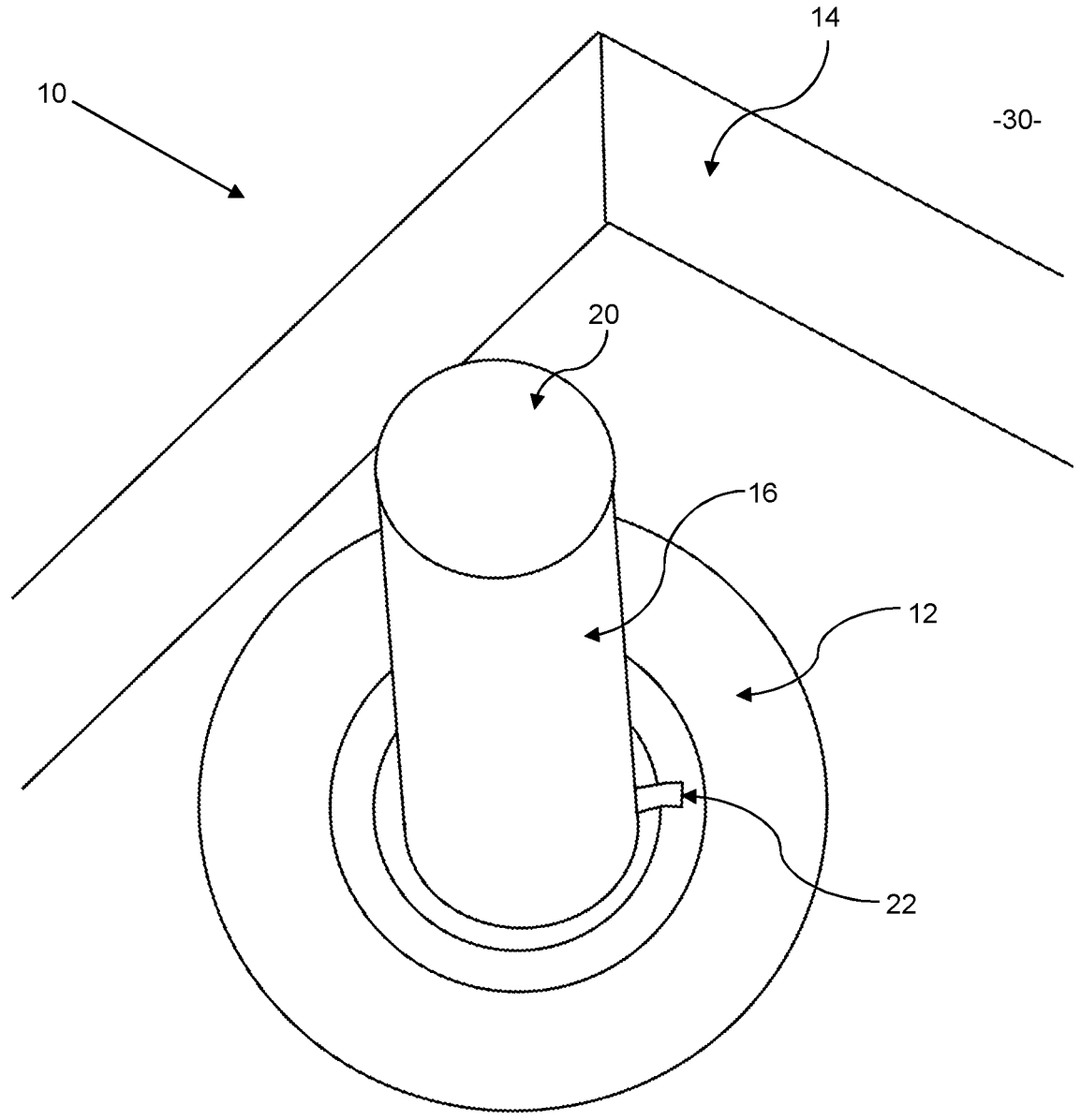
FIG. 1 shows a perspective representation of a first embodiment of an axle support assembly in accordance with the first aspect of the invention.

Referring to FIG. 1, there is indicated an axle support assembly, referenced globally at 10, which is intended to form part of an electrical device, such as an actuator.

The axle support assembly 10 comprises an axle support 12, which may preferably be formed as part of or integrally with a device housing 14 of the relevant electrical device. There is a corresponding axle 16 which is press-fit engagable with the axle support 12 so as to be fixedly securable therein. Typically, one end 18 of the axle 16 will be received into the axle support 12, whilst the other end 20 is held in position in a corresponding axle support 12 on another part of the device housing 14. This leads to a sandwich holding configuration for the axle 16.

The axle 16 will typically be formed from a metal, usually steel, since it is intended to provide a stiff connection to the device housing 14. The axle 16 itself will preferably be former from a harder or stiffer material than the axle support 12. The axle support 12 would ordinarily be formed from the same material as the device housing 14, and in a majority of scenarios, this would be a plastics material, though aluminium can also be considered as a lightweight metal alternative.

In order to allow for compressed air and grease to escape from the axle support 12 as the axle 16 is inserted, a venting channel 22 is provided. In FIG. 1, this can be seen as a groove formed in a side wall 24 of the axle support 12 so as to be contiguous therewith. The venting channel 22 could be formed to have a rectilinear cross-section, as shown; in other words, having the shape of a rectangle or square in cross-section in one or more directions.

Figure 2:
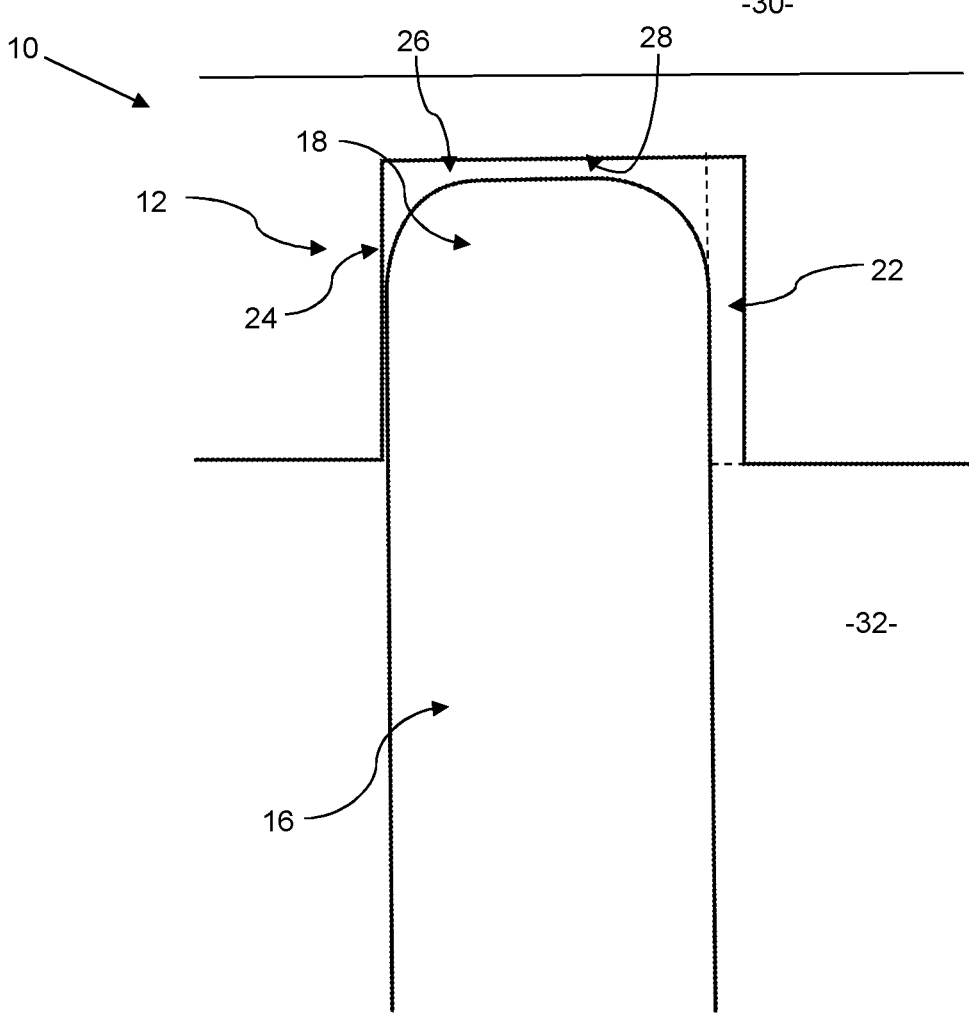
FIG. 2 shows a cross-section through the axle support assembly of FIG. 1, taken through a vertical plane through the venting channel and axle.

The vertical cross-section through the axle-support assembly 10 can be seen in FIG. 2. The axle support 12 has a side wall 24 which is dimensioned so as to tightly fit the axle 16 therein. This would thus usually be formed as a cylindrical or substantially cylindrical recess in the device housing 14, thereby forming an axle receiver 26. The axle 16 can be inserted into the axle support 12 as far as an internal base portion 28 of the axle receiver 26 which prevents further insertion of the axle 16 into the axle support 12.

The internal base portion 28 is preferably closed. In other words, there are no vias, pathways or other through holes which would connect the internal volume of the axle support 12 with an exterior 30 of the device housing 14.

The cross-sectional view of FIG. 2 shows the venting channel 22 in more detail. The venting channel 22 extends from or adjacent to the internal base portion 28 of the axle support 12 so as to provide a pathway to an exterior 32 of the axle support 12 for compressed air and/or grease to escape through. The exterior 32 of the axle support 12 may be the exterior 30 of the device housing 14, but it is much preferred that the exterior 32 be interior of the electrical device housing 14.

The venting channel 22 could therefore be considered to be an air or grease escape channel. It is most preferable that the venting channel 22 discharge into an interior of the electrical device, which is still an exterior 32 of the axle support 12, thereby obviating any issues with external grease contamination. To assist with this, it is preferred that the device housing 14 of the electrical device, once assembled, be water-tight, so that grease exuded into the interior cannot escape from the device housing 14.

The dashed lines show the boundary of the venting channel 22, being contiguous with the axle support 12 whilst also being positioned radially outwardly thereof so that the axle 16 does not block the venting channel 22.

Figures 3A, 3B, 3C:
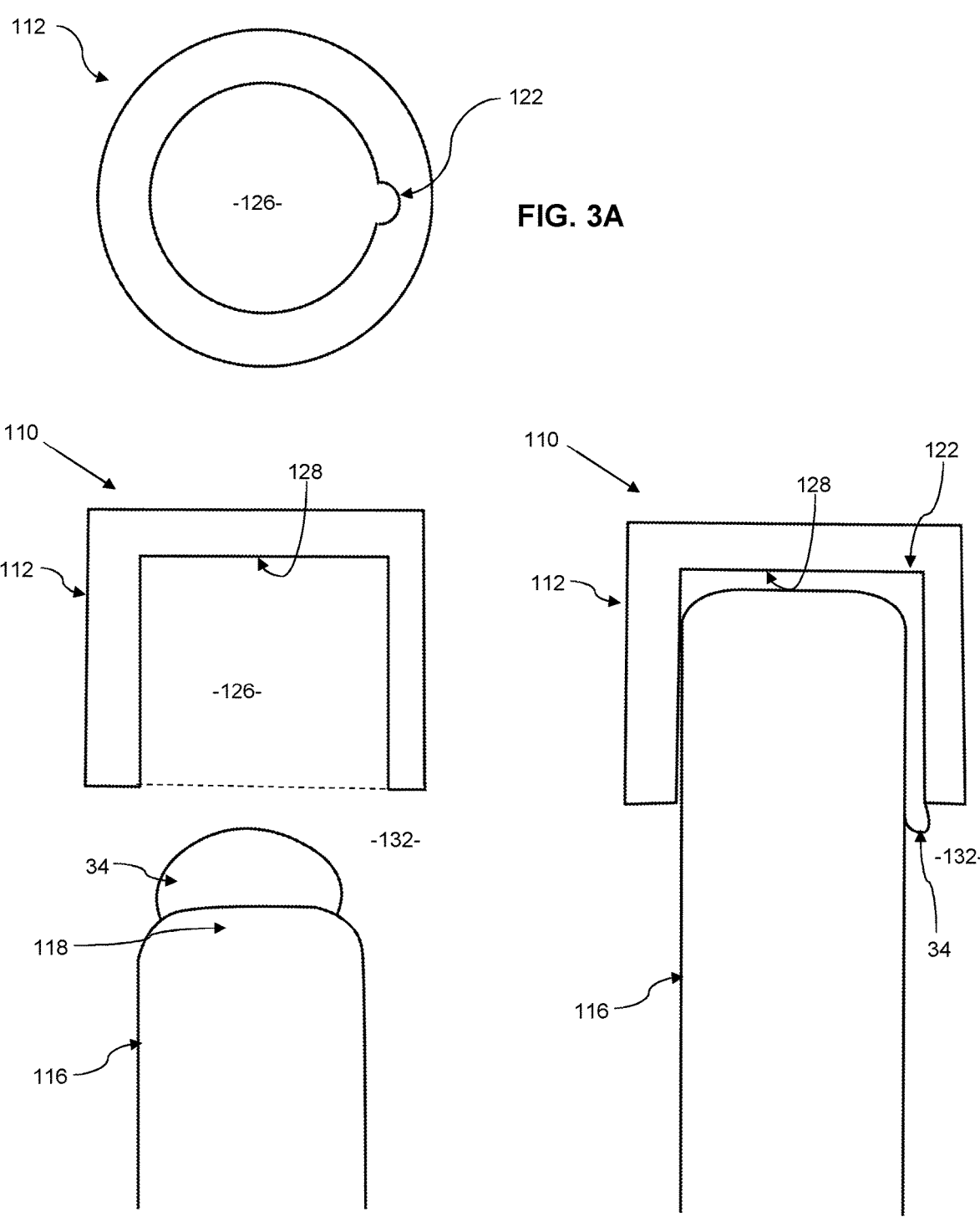
FIG. 3A shows a plan view of the axle support of a second embodiment of an axle support assembly in accordance with the first aspect of the invention.
FIG. 3B shows a cross-sectional representation cross-section through the axle support assembly of FIG. 3A, taken through a vertical plane through the venting channel and axle; prior to insertion of the axle into the axle support.
FIG. 3C shows a cross-sectional representation cross-section through the axle support assembly of FIG. 3A, taken through a vertical plane through the venting channel and axle; following insertion of the axle into the axle support.

FIGS. 3A to 3C show a second embodiment of an axle support assembly 110. The axle support 112 can be seen in plan in FIG. 3A, and in cross-section in FIGS. 3B and 3C, respectively prior to and following insertion of the axle 116. Identical or similar features to the first embodiment will be referenced using identical or similar reference numerals, and further detailed description will be omitted for brevity.

The axle support 112 here has a venting channel 122 which has an at least in part circular cross-section, rather than the rectilinear version of the first embodiment. However, the principle of the design remains the same; the venting channel 122 is contiguously formed with the axle support 112 to provide access from the internal base portion 128 of the axle receiver 126, past the axle 116 once inserted, and out close to the open end of the axle support 112.

To fix the axle 116 in position, grease 34 or similar lubricant is applied to the end 118 of the axle 116 to be inserted, as indicated in FIG. 3B, and the end 118 of the axle 116 is then urged into the axle support 112 to form the press fit. The grease 34 serves to lubricate the axle 116 as it is inserted, and has a secondary function of reducing the assembly force required. Excess grease 34 and compressed air are forced out via the venting channel 122, to an exterior 132 of the axle support 112 inside the device housing, allowing the installer to clean this away.

The same procedure occurs for the other end of the axle 116, being installed into an opposite axle support, typically on a different part of the device housing, following installation of any gears to be supported by the axle 116, where applicable. The axle 16 then provides a stiff internal support within the device housing 14, which may otherwise be slightly compressible if a plastics material or lighter material such as aluminium is used in the construction thereof.

FIGS. 4A to 4D show a third embodiment of an axle support assembly 210. The axle support 212 can be seen in plan in FIG. 4A, and in cross-section in FIGS. 4B and 4C, respectively prior to and following insertion of the axle 216. Identical or similar features to the first and second embodiments will be referenced using identical or similar reference numerals, and further detailed description will be omitted for brevity.

In this arrangement, the axle support 212 may be perfectly cylindrical. No venting channel is present in the device housing or in connection with the axle support 212. Instead, the venting channel 222 is formed in the axle 216, for example, by milling or cutting a longitudinal groove into the side of the axle which is at least as long as the axle support 212 is deep. The venting channel 222 could be rectilinear, part-circular, or could indeed be formed as a helical groove, for example. The venting channel 222 still provides a grease 34 and air escape pathway from the axle receiver 226 to the exterior 232 of the axle support 212.

Figures 4A, 4B, 4C:
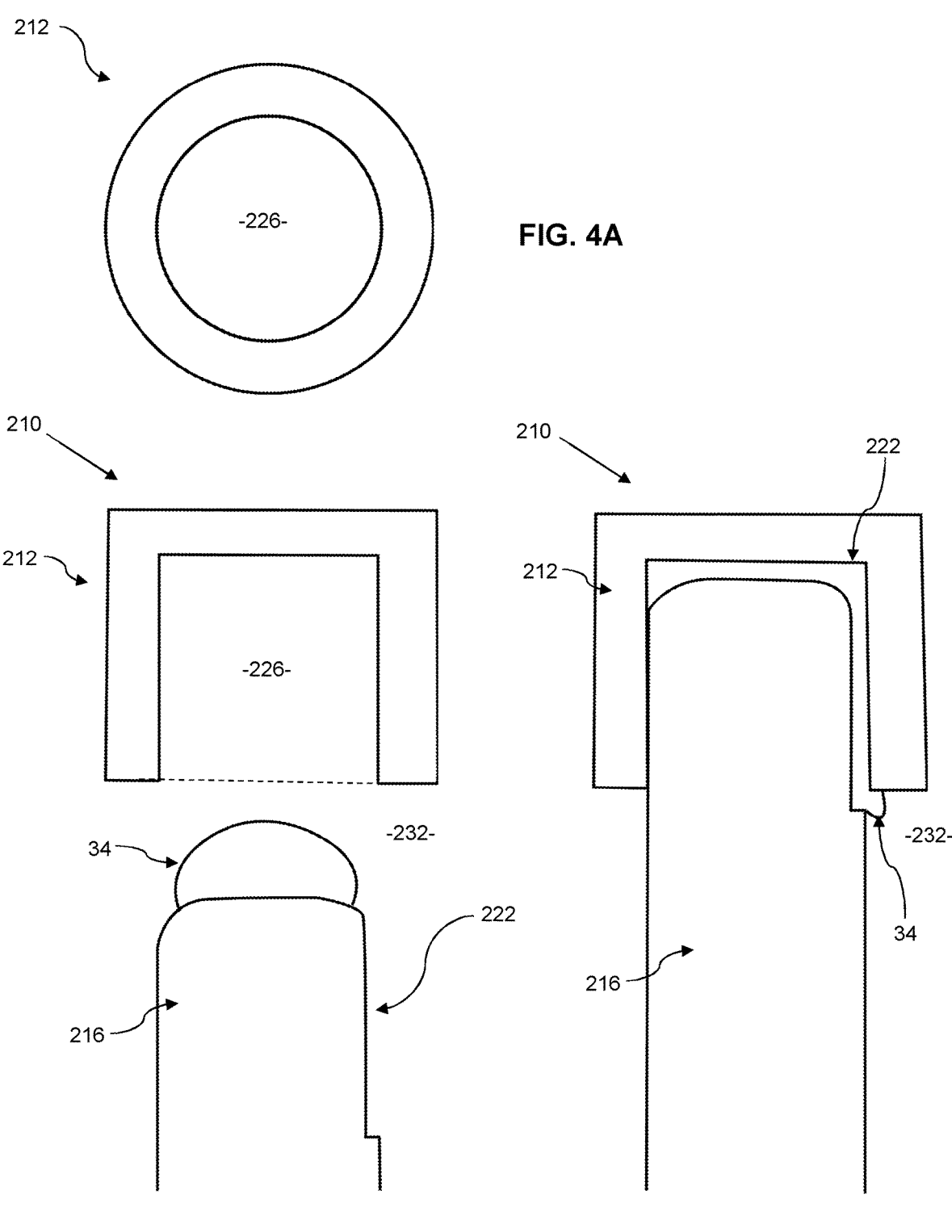
FIG. 4A shows a plan view of the axle support of a third embodiment of an axle support assembly in accordance with the first aspect of the invention.
FIG. 4B shows a cross-sectional representation cross-section through the axle support assembly of FIG. 4A, taken through a vertical plane through the venting channel and axle; prior to insertion of the axle into the axle support.
FIG. 4C shows a cross-sectional representation cross-section through the axle support assembly of FIG. 4A, taken through a vertical plane through the venting channel and axle; following insertion of the axle into the axle support.
Figure 4D:
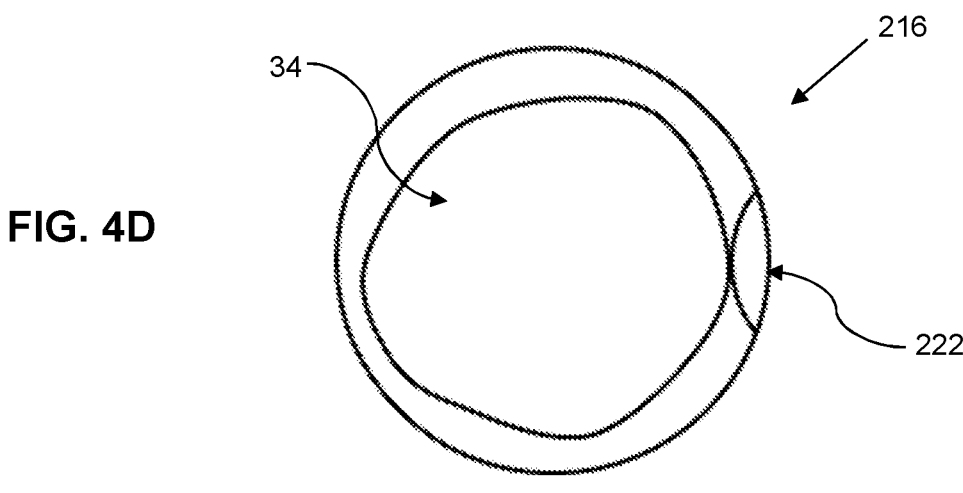
FIG. 4D shows a plan view of the axle of FIG. 4B.

FIG. 4D shows the axle 216 in plan, indicating the shape of the venting channel 222. Here, this is formed as an arcuate or part-circular groove running down the length of the axle 216.

Figure 4E:
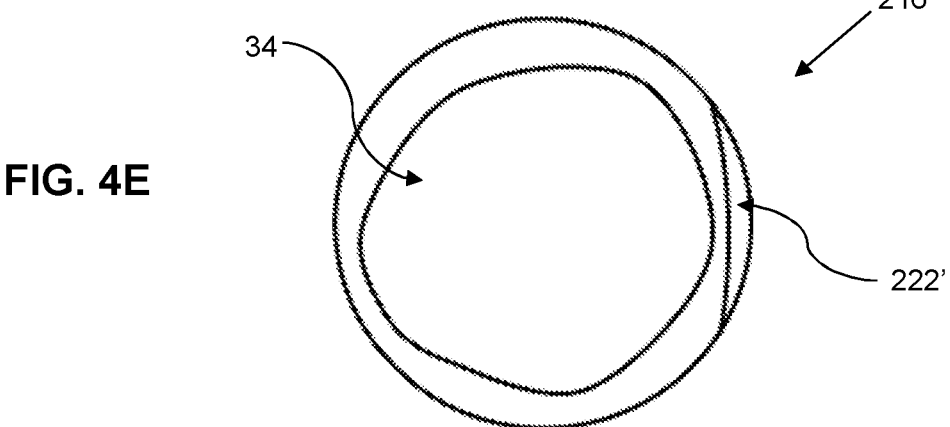
FIG. 4E shows a plan view of a first alternative embodiment of an axle suitable for use with the axle support of FIG. 4A.

An alternative venting channel 222' is shown in the variant axle 216' of FIG. 4E. Instead of cutting a part-circular groove, which might be achieved by a drill bit, the axle 216' has a linear segment cut out of its side to form the venting channel 222'. This could be cut off via a more traditional sawing action, or by moving the axle 216' relative to a drill or milling machine.

Figure 4F:
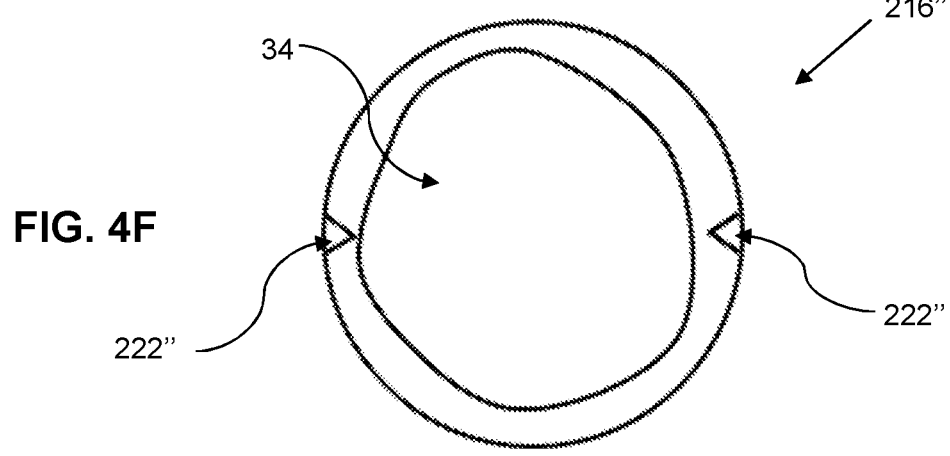
FIG. 4F shows a plan view of a second alternative embodiment of an axle suitable for use with the axle support of FIG. 4A.

FIG. 4F shows an alternative construction of the axle 216", in which at least the end of the axle 216" is provided with a multi-line knurling, leading to a plurality of substantially triangular cross-section venting channels 222" being formed around the perimeter of the axle 216". In the embodiment shown, only two said venting channels 222" are shown, though a typical knurling might have a plurality of uniformly spaced-apart venting channels 222" formed therein. Whilst a single venting channel as outlined in the preceding embodiments is preferred from many manufacturing viewpoints, it is entirely feasible to provide more than one venting channel through which air and grease may escape. Indeed, the knurling process which forms the axle 216" of FIG. 4F may enable the formation of a comparatively low-cost axle.

Figures 5A, 5B, 5C:
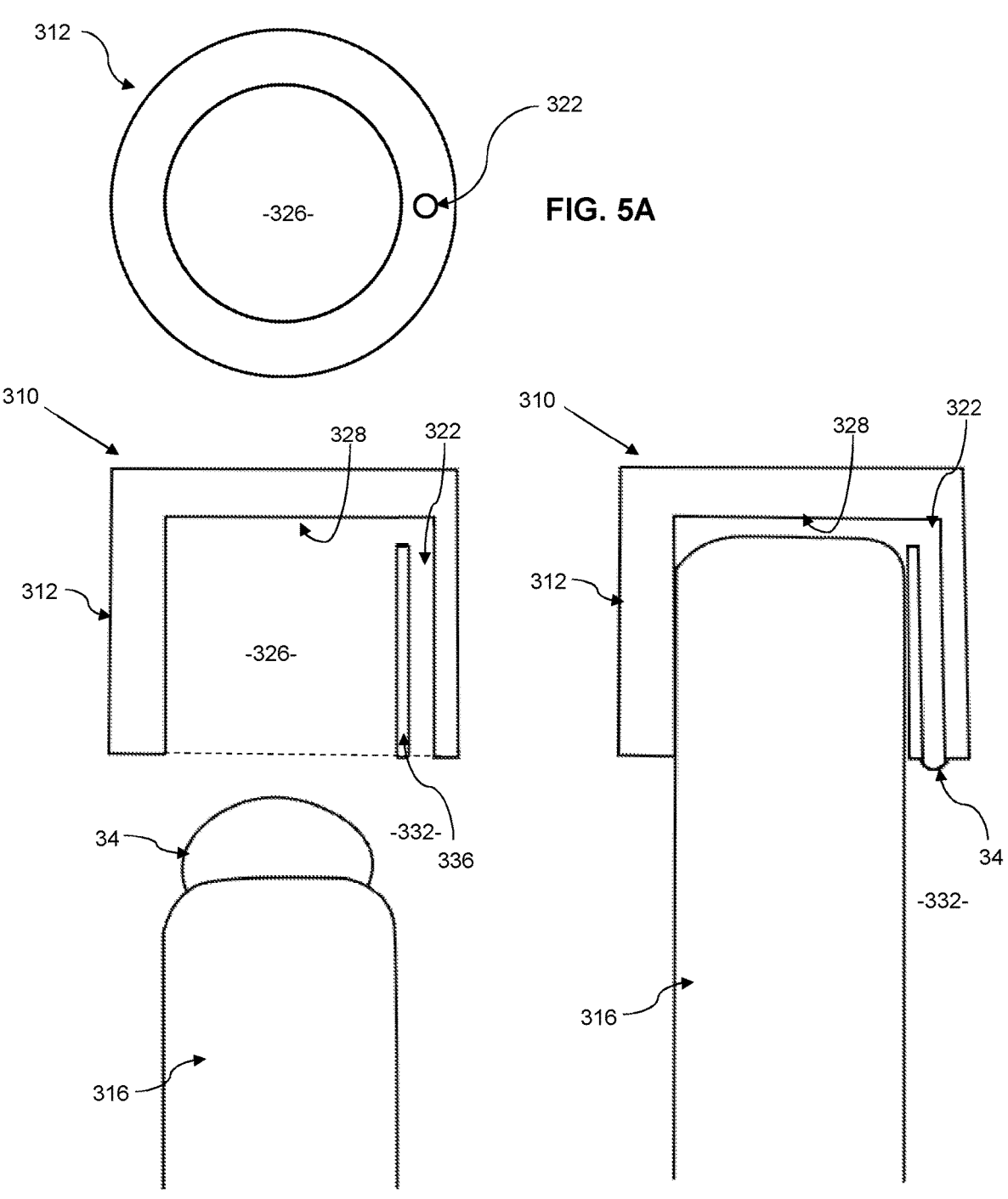
FIG. 5A shows a plan view of the axle support of a fourth embodiment of an axle support assembly in accordance with the first aspect of the invention.
FIG. 5B shows a cross-sectional representation cross-section through the axle support assembly of FIG. 5A, taken through a vertical plane through the venting channel and axle; prior to insertion of the axle into the axle support.
FIG. 5C shows a cross-sectional representation cross-section through the axle support assembly of FIG. 5A, taken through a vertical plane through the venting channel and axle; following insertion of the axle into the axle support.

FIGS. 5A to 5C show a fourth embodiment of an axle support assembly 310. The axle support 312 can be seen in plan in FIG. 5A, and in cross-section in FIGS. 5B and 5C, respectively prior to and following insertion of the axle 316. Identical or similar features to the first and second embodiments will be referenced using identical or similar reference numerals, and further detailed description will be omitted for brevity.

In this arrangement, there is provided a venting channel 322 adjacent axle receiver 326 which is in the form of a bounded conduit extending from the internal base portion 328 of the axle support 312 through to the exterior 332 of the axle support 312. In this arrangement, the majority of the axle support 312 remains cylindrical, and there is no contamination of the axle 316 with the escaping grease 34 and compressed air. A barrier 336 thus exists between the venting channel 322 and the axle 316 in use.

In all of the embodiments, it is preferred that the axle be formed from a metal such as steel, whilst the device housing, typically an actuator housing, be formed from plastics material. However, the present invention can be utilised without any specific reference to specific material construction.

It is therefore possible to provide a venting channel in an axle support for an electrical device, such as an actuator, which allows for grease and compressed air to be evacuated when an axle is fixed in place in a corresponding axle support. Typically, this axle support would be inbuilt into the device housing, and the venting channel would not discharge to an exterior of the electrical device, so as to avoid grease contamination.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. An axle support assembly for an electrical device, the axle support assembly comprising:

an axle support defining an axle receiver having a cylindrical or substantially cylindrical side wall and a closed internal base portion configured to receive an end of an axle by press-fit insertion;

the axle having the end which is dimensioned to be press-fit into the axle receiver; and at least one venting channel is formed as an open groove in the cylindrical or substantially cylindrical side wall of the axle support or in the axle, wherein the venting channel is formed contiguously with the cylindrical or substantially cylindrical side wall of the axle support and the venting channel forms a bounded conduit from the closed internal base portion of the axle support through to an exterior of the axle support for pressure relief during assembly, wherein the press-fit engagement is configured to maintain water-tight integrity of the axle support assembly after assembly.

2. The axle support assembly as claimed in claim 1, wherein the axle is formed from metal.

3. The axle support assembly as claimed in claim 1, wherein the axle support is formed from a plastics material or metal.

4. The axle support assembly as claimed in claim 1, wherein the axle is formed from a harder and/or stiffer material than the axle support.

5. The axle support assembly as claimed in claim 1, wherein the venting channel is formed in the axle.

6. The axle support assembly as claimed in claim 1, wherein the venting channel has a rectilinear cross-section.

7. The axle support assembly as claimed in claim 1, wherein the venting channel has an at least in part circular cross-section.

8. The axle support assembly as claimed in claim 1, wherein the axle is a gear-support axle.

9. An electrical device comprising an axle support assembly as claimed in claim 1.

10. The electrical device as claimed in claim 9, wherein the axle support is formed as part of a device housing of the electrical device.

11. The electrical device as claimed in claim 10, wherein the venting channel extends between the internal base portion of the axle receiver and an interior of the device housing.

12. The electrical device as claimed in claim 9, wherein the axle support is formed as part of an intermediate support structure within a device housing of the electrical device.

13. The electrical device as claimed in claim 9, wherein the electrical device is an actuator.

* * * * *